United States Patent [19]

Kohama et al.

[11] 4,142,989
[45] Mar. 6, 1979

[54] PROCESS FOR CONTINUOUSLY REGENERATING A DEGRADED CATALYST USED FOR REMOVING NITROGEN OXIDES FROM EXHAUST GAS

[75] Inventors: Hiroyuki Kohama, Daido; Shun-ichi Mizukami, Kobe, both of Japan

[73] Assignee: Kobe Steel, Ltd., Kobe, Japan

[21] Appl. No.: 825,071

[22] Filed: Aug. 16, 1977

[30] Foreign Application Priority Data

Aug. 17, 1976 [JP] Japan .................................. 51-98320
Jun. 9, 1977 [JP] Japan .................................. 52-68694

[51] Int. Cl.² ........................ B01J 21/20; B01J 23/92; B01J 23/94; B01D 53/34
[52] U.S. Cl. .................................. 252/411 R; 55/79; 423/239; 423/244; 252/411 S; 252/418
[58] Field of Search ............. 252/411 R, 411 S, 416, 252/418, 419; 423/239, 244; 55/59, 23, 74, 79

[56] References Cited

U.S. PATENT DOCUMENTS

| | | | |
|---|---|---|---|
| 2,305,730 | 6/1944 | Degnen et al. ........... | 23/288 G |
| 2,549,104 | 4/1951 | Lechthaler .............. | 252/411 R |
| 4,043,939 | 8/1977 | Kassoka ................. | 252/416 |
| 4,044,102 | 8/1977 | Muraki et al. .......... | 252/411 R |
| 4,061,477 | 12/1977 | Murakami .............. | 252/417 |

FOREIGN PATENT DOCUMENTS

37-204  1/1962  Japan ........................................ 55/79

OTHER PUBLICATIONS

Derwent Pbl. Ltd., 1949, v/11, DE-804-317, Esso Research & Eng. Co., 2/28/74.

*Primary Examiner*—Winston A. Douglas
*Assistant Examiner*—P. E. Konopka
*Attorney, Agent, or Firm*—Oblon, Fisher, Spivak, McClelland & Maier

[57] ABSTRACT

The present invention relates to a continuous type catalyst regeneration process for continuously heating and regenerating a degraded catalyst from a denitration apparatus and recycling the regenerated catalyst to the denitration apparatus for repeated use thereof. In accordance with the present invention, a degraded catalyst is intermittently and by predetermined amounts charged into a heating furnace through a first damper mechanism in a gas-sealed state while the surface level of a catalyst held in the heating furnace is maintained lower than the outlet of catalyst regenerating gas and is therein subjected to heat-treatment at a temperature of 400°–650° C. with catalyst-regenerating gas introduced into the heating furnace. Thus regenerated catalyst is intermittently and by predetermined amounts discharged from the heating furnace toward a second damper mechanism through a catalyst delivery mechanism and recycled to the denitration apparatus.

6 Claims, 3 Drawing Figures

PROCESS FOR CONTINUOUSLY REGENERATING A DEGRADED CATALYST USED FOR REMOVING NITROGEN OXIDES FROM EXHAUST GAS

BACKGROUND OF THE INVENTION

Field of the Invention

The present invention relates to a continuous type catalyst regeneration apparatus for continuously heating and regenerating a degraded catalyst from a denitration apparatus and recycling the regenerated catalyst to the denitration apparatus for repeated use thereof.

With recent expansion of the operation scale in industries, various types of pollutions have become a serious problem and the need for a concentration of efforts on prevention of these pollutions is now considered a pressing matter. For example, various research works and investigations have been made in the art to develop methods for removing effectively and economically nitrogen oxides contained in smokes and exhaust gases, which are considered to be one of the causes of photochemical smogs and the like. As one of such methods, there can be mentioned a catalytic reduction method using ammonia as a reducing agent. In order to practice this catalytic reduction method economically advantageously it is necessary to regenerate a catalyst which has been used for the reaction and degraded.

It is generally considered that this regeneration can be accomplished effectively according to the heating regeneration technique. According to the conventional heating regeneration method customarily used in various denitrating systems, a catalyst is withdrawn from a denitrating apparatus and a large quantity of the degraded catalyst is regenerated at one time in a heating furnace of the batch type. This conventional method, however, involves various defects such as mentioned below:

(1) When the degraded catalyst is withdrawn from the denitration apparatus, the operation of the denitration apparatus must be stopped.

(2) When it is desired to operate the denitration apparatus during the regeneration operation, it is necessary to arrange and use a spare catalyst.

(3) The operation of delivering the degraded catalyst to the regeneration apparatus is indispensable.

(4) An additional space is necessary for the regeneration apparatus.

SUMMARY OF THE INVENTION

It is a primary object of the present invention to provide a process and an apparatus which can regenerate continuously a degraded catalyst and recycle the regenerated catalyst to a denitration apparatus without detrimentally influencing the operation of the denitration apparatus.

A secondary object of the present invention is to provide a process and an apparatus which can perform continuous regeneration treatment of a degraded catalyst effectively with economical advantages.

A third object of the present invention is to provide a process and an apparatus for the continuous regeneration treatment of degraded catalysts in which the amount of catalyst held in a heating zone for the heat treatment of the catalyst, the heating time, and the flow of a heating gas are always made constant to thereby enable a stable heat treatment of the degraded catalyst.

In accordance with a first aspect of the present invention, there is provided a continuous type catalyst regeneration process wherein a degraded catalyst from a denitration apparatus is intermittently by predetermined amounts charged into a heating furnace in the gas-sealed state while the surface level of a catalyst held in the heating furnace is maintained lower than the outlet of catalyst-regenerating gas, and then subjected to heat treatment at a temperature of 400°–650° C. (500°–650° C. in case of alumnia type catalyst, 400°–600° C. in case of titania type catalyst) with catalyst regenerating gas introduced into the heating furnace. Thus, regenerated catalyst is intermittently and by predetermined amounts discharged from the heating furnace in the gas-sealed state and recycled to the denitration apparatus.

In accordance with a second aspect of the present invention, there is provided a continuous type catalyst regeneration process as set forth in the above aspect wherein the predetermined amounts of the catalyst to be charged into the heating furnace is such that the charged catalyst can be heated to the regeneration temperature within 10 minutes after being charged.

In accordance with a third aspect of the present invention, there is provided a continuous type catalyst regeneration apparatus for continuously heating and regenerating a degraded catalyst from a denitration apparatus and recycling the regenerated catalyst to the denitration apparatus for repeated use thereof, which comprises a heating furnace for heating and regenerating the degraded catalyst, first and second damper mechanisms disposed in the front and rear portions of the heating furnace, respectively, to feed the catalyst in the gas-sealed state and a catalyst delivery mechanism disposed between the heating furnace and the second damper mechanism to feed the heated and regenerated catalyst intermittently by predetermined amounts toward the second damper mechanism.

In accordance with a fourth aspect of the present invention, there is provided a continuous type catalyst regeneration apparatus as set forth in the above-noted third aspect wherein the heating furnace includes (1) a heating furnace proper for holding the degraded catalyst, (2) a catalyst-regenerating gas feed mechanism comprising a hot gas-generating furnace for heating a catalyst-regenerating gas, a catalyst-regenerating gas feed pipe connecting said hot gas-generating furnace to the lower portion of the heating furnace proper and a catalyst-regenerating gas discharge pipe disclosed in the upper portion of the heating furnace proper, the catalyst-regenerating gas feed mechanism being arranged so that the catalyst-regenerating gas is flown in the heating furnace proper countercurrently to the movement of the catalyst in the heating furnace proper, and (3) heating means for heating the heating furnace proper from the outside.

BRIEF DESCRIPTION OF THE DRAWINGS

Various other objects, features and attendant advantages of the present invention will be more fully appreciated as the same becomes better understood from the following detailed description when considered in connection with the accompanying drawings wherein like reference characters designate like or corresponding parts throughout the several views, and wherein.

catalyst to the regeneration temperature to about 600° C.

TABLE 1

| EXAMPLE | THE AMOUNT OF THE CATALYST HELD IN THE HEATING FURNACE (l) | SPACE VELOCITY (1/H) | THE AMOUNT OF THE CATALYST CHARGED INTO THE HEATING FURNACE (l) | | | | | |
|---|---|---|---|---|---|---|---|---|
| | | | 1 | 5 | 10 | 15 | 20 | |
| 1 | 120 | 1000 | 2.5-3 | 6-7 | 10-12 | 14-17 | 18-21 | |
| | | 2000 | 1.0-2.0 | 3-4 | 5-6 | 7-9 | 9-11 | |
| | | 3000 | 0.8-1.0 | 2-2.5 | 3.5-4.5 | 5-6.0 | 6-8 | unit min. |
| | | | 3 | 15 | 30 | 45 | 60 | |
| 2 | 300 | 1000 | 2.0-3.5 | 5-6 | 8-11 | 12-16 | 16-20 | |
| | | 2000 | 0.8-2.0 | 3-4 | 5.5-6.5 | 7-9.5 | 8-10 | |
| | | 3000 | 0.7-1.2 | 2.5-3.5 | 3.5-4.0 | 4.0-5.5 | 5.5-7 | unit min. |

Note

The residual time of the catalyst in the heating furnace is constant in the case of example 1 as well as example 2. In example 1, the diameter of the heating furnace is 450 mm. In example 2, the diameter of the heating furnace is 800 mm. In these examples, alumina type catalyst is heated in the heating furnace from room temperature to about 600° C.

Figure 3:
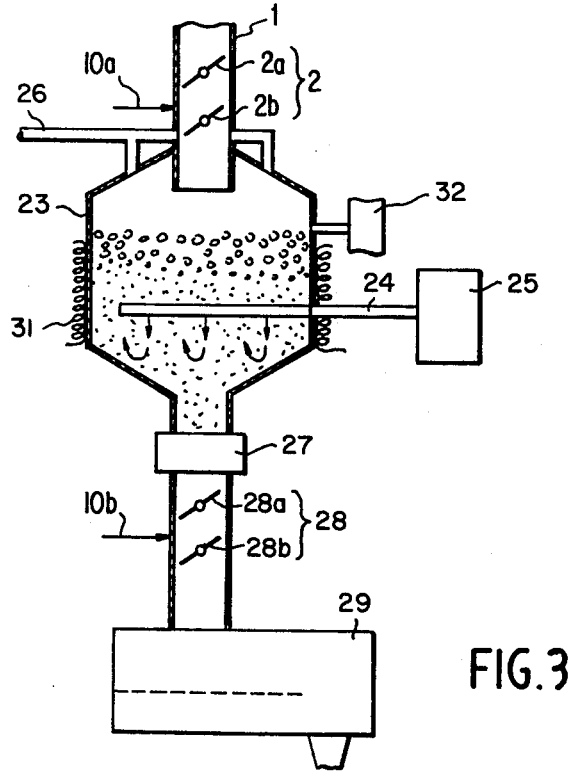

FIG. 3 is a longitudinally sectional front view showing another embodiment of the apparatus of the present invention.

DETAILED DESCRIPTION OF THE PREFERRED EMBODIMENTS

The present invention will now be described in detail by reference to embodiments illustrated in the accompanying drawings. The basic structure of a denitration apparatus of the moving bed type will first be described by reference to FIG. 1.

In a denitration apparatus 15, an exhaust gas is treated at a temperature of 180°-250° C. by contact with a catalyst for denitration, for example, alumina type catalyst such as alumina or silica-alumina carrier on which vanadium oxides are deposited, or titania type catalyst such as titania containing carrier on which vanadium oxides or copper oxides are deposited.

After removing adhering dusts by a vibrator 6, the catalyst used in a denitration apparatus 15 is recycled to the apparatus 15 by a bucket elevator 14. An exhaust gas containing nitrogen oxides is fed to the denitration apparatus 15 from an inlet 16 thereof, and nitrogen oxides are removed by a catalytic reduction reaction conducted in the denitration apparatus 15. The resulting clean gas is discharged from the denitration apparatus 15 through an exit 17 thereof. The continuous type catalyst regeneration apparatus according to the present invention is disposed in any of zones A, B and C as set forth in FIG. 1.

Figure 1:
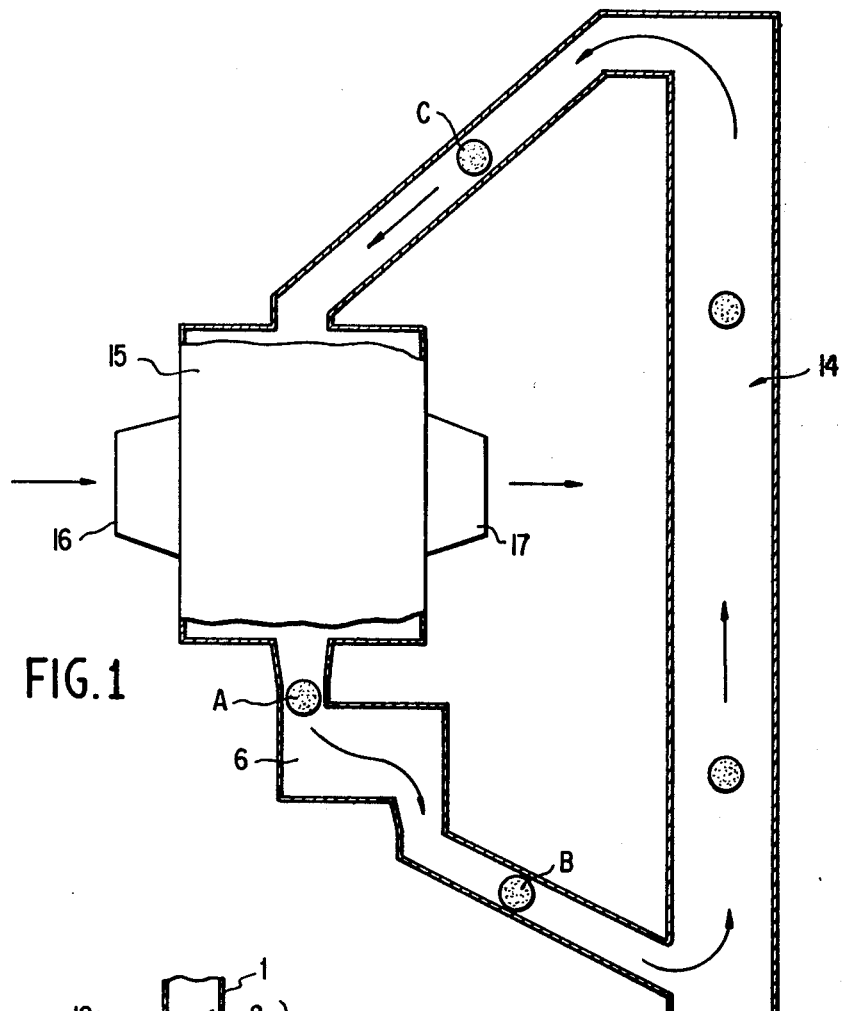
FIG. 1 is a diagram illustrating a dentiration apparatus of the moving bed type.
Figure 2:
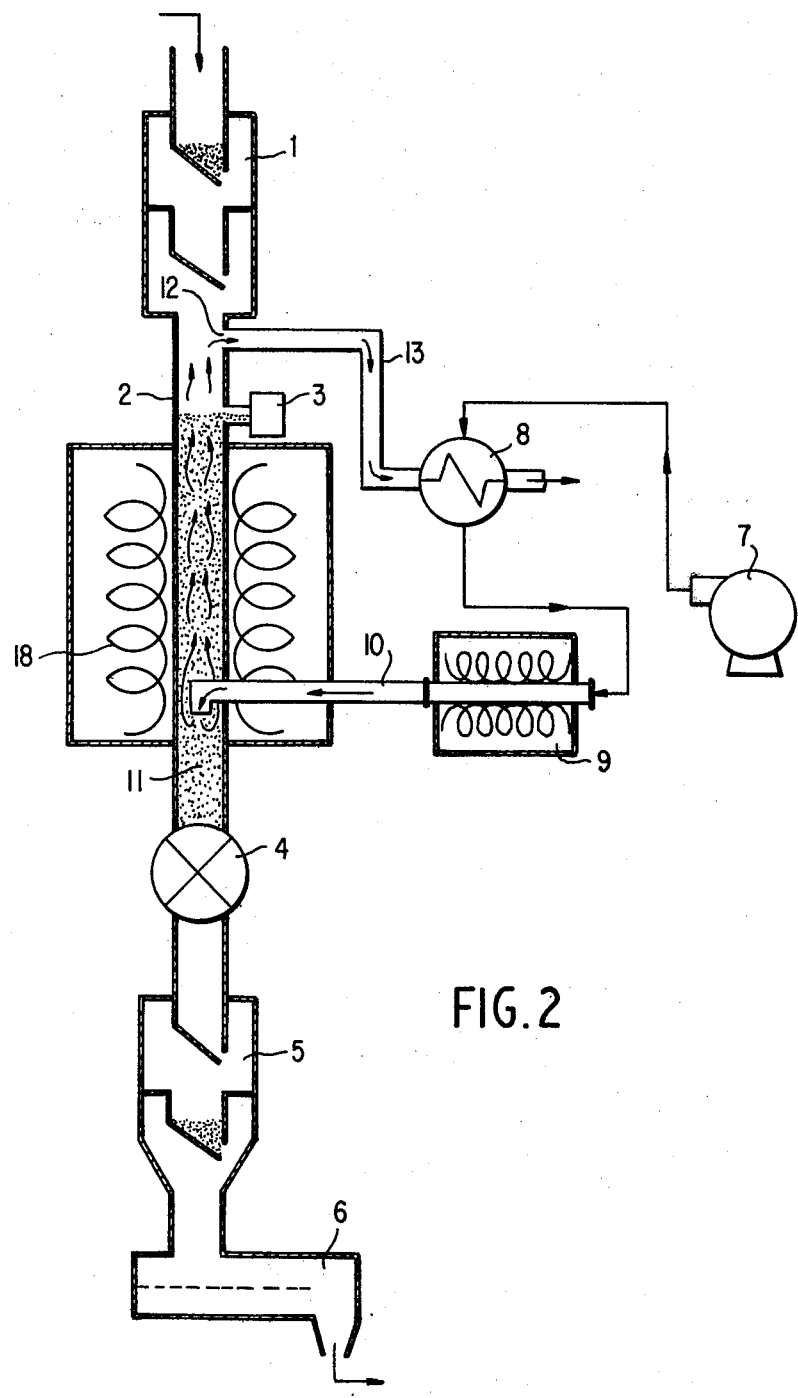
FIG. 2 is a longitudinally sectional front view showing the main portion of a continuous type catalyst regeneration apparatus according to one embodiment of the present invention.

An embodiment in which the apparatus of the present invention is disposed in zone A in FIG. 1 and a degraded (used) catalyst is regenerated by the so disposed regeneration apparatus will now be described by reference to FIG. 2.

The degraded catalyst discharged from the lower portion of the denitration apparatus 15 is introduced into an upper double damper 1 (which may be substituted by a triple damper) and is intermittently fed into the upper portion of a heating furnace 2 with opening and closing movements of damper 1.

The amount of the catalyst to be charged into the heating furnace 2 every predetermined time is very small as compared with the amount of the catalyst held in the heating furnace proper 2 and should be also such that the charged catalyst can be heated to a regeneration temperature within 10 minutes after being charged, in order to prevent the deterioration of the catalyst. As examples, shown in the table 1 is the relationship between the amount of catalyst to be charged and the period which was necessary for heating the charged The amount of the catalyst held in the heating furnace proper 2 is always kept constant by a level meter 3 and a catalyst discharge device 4, disposed in the lower portion of the heating furnace 2 wherein the surface level of the catalyst held in the heating furnace 2 is set lower than the opening 12 for discharging catalyst regenerating gas, in view of the fact that a catalyst-poisoning component which is desorbed by heating the degraded catalyst in the heating furnace 2 is again adsorbed on the catalyst positioned above the opening level 12 if the catalyst is accumulated above the opening level. Otherwise, the catalyst, which thus adsorbs the catalyst-poisoning component, results in failure or destruction when the catalyst is shifted to the lower portion of the heating furnace.

In order to prevent degradation of the activity of the catalyst in the denitration apparatus 15 by leakage of a part of a catalyst-poisoning component-containing gas generated by heating the degraded catalyst in the heating furnace 2 or to prevent intrusion of outer air having detrimental influences on the heating regeneration treatment into the heating furnace 2, a good air-tightness is maintained in the damper mechanism 1 and the damper mechanism 1 is arranged to have such a structure as will facilitate passage of the catalyst therethrough.

Heating means such as an electric heater or gas burner (e.g. an electric heater 18 in FIG. 2) is disposed outside the heating furnace 2 to heat directly or indirectly the heating furnace proper 2 from the outside, whereby the temperature of the heating furnace proper 2 is elevated or is controlled to a predetermined level.

A high-temperature catalyst-regenerating gas such as air, an inert gas, a clean combustion gas or the like is fed into the heating furnace 2 to heat directly the catalyst in the heating furnace 2 to a regeneration temperature. In case of alumina type catalyst, it is preferred that the regeneration temperature is in the range of 500°-650° C. In case of the titania type catalyst, it is preferred that the regeneration temperature is in the range of 400°-600° C.

A mechanism for feeding this high-temperature gas will now be described. A catalyst-regenerating gas is fed to a heat exchanger 8 by a blower 7 and is fed in the form of a preheated gas into a hot gas-generating furnace 9 and heated therein. The catalyst-regenerating gas heated in the hot gas-generating furnace 9 is fed to the lower portion 11 of the catalyst packed in the heating furnace 2 through a gas introduction pipe 10 attached to the lower portion of the heating furnace 2. The gas passage of the heating furnace 2 is shut from the denitration apparatus 15 by means of upper and lower dampers 1 and 5. Accordingly, the catalyst-regenerating gas introduced into the heating furnace 2 rises toward a gas discharge opening 12 from the lower portion 11 of the packed catalyst, and it is then passed through a discharge pipe 13 and subjected to the heat exchange and discharged from the system.

The manner of introduction of the catalyst-regenerating gas into the heating furnace 2 is not particularly critical in the apparatus of the present invention. In view of the contact efficiency between the catalyst and the regenerating gas and the catalyst regeneration efficiency, it is preferred that the catalyst-regenerating gas countercurrently flow to the delivery of the catalyst as in the foregoing embodiment.

The regenerated catalyst discharged by catalyst delivery device 4 is passed through a lower double damper 5 (which may be replaced by a triple damper) and introduced into a vibrating machine 6 located between damper 5 and bucket elevator 14 where dust and ashes are removed from the regenerated catalyst. Then, the regenerated catalyst is supplied by predetermined amounts to bucket elevator 14 and is fed to the upper portion of denitration apparatus 15 by bucket elevator 14.

The structure of catalyst delivery device 4 is not particularly critical so far as it does not bite into the catalyst and has an air-tightness. Practically, there can be used, for example, a table feeder, a roll feeder and a belt feeder as catalyst delivery device 4.

Another embodiment of the apparatus of the invention will now be described by reference to FIG. 3. A double damper mechanism 2 including two dampers 2a and 2b is disposed midway of a pipe 1 for feeding a catalyst to be regenerated. Also provided are a heating furnace 23, a regenerating gas introduction pipe 24, a hot gas feed mechanism 25, a pipe 26 connected to a flue to discharge poisonous gases generated at the regeneration step, such as $SO_X$, a catalyst discharge or delivery device 27, a double damper mechanism 28 including two dampers 28a and 28b, and a vibrator 29 electric heater 31 and level meter 32, respectively. Reference numerals 10a and 10b represent purge pipes. The degraded catalyst is appropriately fed into feed pipe 1 through the feed mechanism and is held in damper 2a in a predetermined amount.

The catalyst held in damper 2a for a predetermined time is shifted to damper 2b and is then charged into the heating furnace 23. When the catalyst is charged into the heating furnace 23 from damper 2b, the damper 2a is closed and a purge gas introduced from the purge pipe 10a inhibits passage of a gas rising from the interior of the heating furnace 23.

The catalyst introduced into the heating furnace 23 is heated by a gas meeting the temperature condition for regeneration which is prepared in the hot gas generating mechanism 25 and introduced into the heating furnace 23 through the regenerating gas introduction pipe 24.

The amount of the thus charged catalyst is very small as compared with the amount of the catalyst held in the heating furnace 23 for a predetermined time as mentioned above. The temperature of the thus charged catalyst is, therefore, elevated to the regeneration temperature in a short time. A gas formed by desorption of poisonous components and the like from the catalyst is discharged from the system through discharge pipe 26.

The so regenerated catalyst is withdrawn by delivery or discharge device 27 and is introduced into vibrator 9 by alternating sequential operations of dampers 28a and 28b. A purge gas is appropriately introduced from the purge pipe 10b to prevent rising of the gas from the lower portion.

When it is necessary to reduce the water content of the catalyst before the delivery to the heating furnace 23, a drying furnace is disposed before the feed pipe 1 connected to the heating furnace 23. Any of a number of different drying furnaces can be used so far as a continuous catalyst drying mechanism is included. However, it is preferred to employ a drying furnace of the type where the catalyst is dried under forced circulation of a drying gas such as air, and a drying furnace having a shape the same as that of the heating furnace 23 is most preferably employed.

A comparative regeneration experiment using the above-illustrated apparatus of the present invention and a conventional fixed type apparatus where the temperature is gradually elevated has been conducted so as to obtain the results shown in Table 2 given hereinafter.

Catalysts of the $Al_2O_3$ and $TiO_2$ types used for removal of $NO_X$ from the dirty gas containing $SO_X$ are used as sample catalysts. Comparison of both apparatuses is made based on the sulfur content in the regenerated catalyst.

In case of the apparatus of the present invention, regeneration is carried out in the following manner. At an interval of 20 minutes 10 l of the catalyst at room temperature is charged into the heating furnace proper maintained at a high temperature so that the temperature of the charged catalyst is elevated to the regeneration temperature over a period of about 10 minutes. In case of the alumina type catalyst, the regeneration temperature is adjusted to 550° C. and in case of the titania type catalyst, the regeneration temperature is adjusted to 450° C. The catalyst is maintained at this regeneration temperature for about 2 hours.

In case of the conventional fixed type apparatus, the temperature (room temperature) of the catalyst is gradually elevated to the above regeneration temperature by means of a batch type heating furnace, and the catalyst is maintained at the regeneration temperature for about 2 hours.

Table 2

|  | Alumina Type Catalyst | | Titania Type Catalyst | |
| --- | --- | --- | --- | --- |
|  | S Content (% by weight) | Regeneration Efficiency (%) | S Content (% by weight) | Regeneration Efficiency (%) |
| Before Regeneration | 6.3 | — | 3.8 | — |
| After Regeneration | | | | |
| fixed bed type apparatus | 5.2 | 17.5 | 1.0 | 73.7 |
| apparatus of the present invention | 2.7 | 57.1 | 0.4 | 89.5 |

As will be apparent from the test results shown in Table 2, in the catalyst regenerated according to the present invention, the S content is remarkably reduced, and a high regenerating effect can be attained according to the present invention.

As will be apparent from the foregoing illustration, when the regeneration apparatus of the present invention is built in a denitration apparatus of the moving bed type, the catalyst moved in the denitration apparatus can be continuously regenerated and therefore, the amount of the catalyst to be treated for a unit time can be reached and the apparatus can be made compact. Accordingly, the area necessary for regeneration of the catalyst (the area for storage of the catalyst, the area for the heating furnace and the like) can be remarkably diminished and the cost of the apparatus can be reduced. Further, since the degraded catalyst is not discharged from the system regeneration, the denitration apparatus need not be stopped for withdrawal or packing of the catalyst, and further, the amount of the catalyst to be used can be reduced. In addition to the foregoing effects, the apparatus of the present invention has the following advantages over the conventional regeneration apparatus operated outside the denitration apparatus.

(1) The operation of transferring the catalyst to the other zone can be omitted.

(2) When the regeneration is conducted batchwise, a treated gas containing poisonous components at high concentrations is discharged and disposal of such treated gas involves various problems. According to the present invention, the amount of a treated gas discharged in a unit time is very small and disposal of such treated gas if often unnecessary.

(3) An operator of the denitration apparatus can watch and inspect the regeneration apparatus and can control the operation of the regeneration apparatus simultaneously with the operation of the denitration apparatus.

According to the present invention, by combining the regeneration apparatus including the damper mechanism, the level meter and the other equipment such as mentioned above with a denitration apparatus of the moving bed type, the heating regeneration treatment of the catalyst can be accomplished continuously and constantly while the catalyst is being delivered in the denitration apparatus and the regeneration of the catalyst for removal of nitrogen oxides can be performed at very high efficiency. Moreover, the amount of a poisonous component-containing gas formed by the regeneration treatment can be remarkably diminished and occurrence of air pollution can be effectively prevented. Accordingly, the present invention is very valuable economically and industrially.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. A process for continuously regenerating a degraded catalyst from an apparatus for removing nitrogen oxides from an exhaust gas comprising:

charging said degraded catalyst from said apparatus into a heating furnace in a gas-sealed state intermittently by predetermined amounts while the surface level of the catalyst held in the heating furnace is maintained lower than the outlet of catalyst regenerating gas;

subjecting said degraded catalyst to heat treatment at a regeneration temperature of 400°-650° C. with catalyst regenerating gas introduced into the heating furnace, wherein said predetermined amounts of the catalyst to be charged into the heating furnace are such that the charged catalyst can be heated to said regeneration temperature within 10 minutes;

discharging thus regenerated catalyst from the heating furnace in the gas-sealed state intermittently by predetermined amounts; and recycling said regenerated catalyst to said apparatus.

2. The process of claim 1 wherein said removal of said nitrogen oxides from said exhaust gas is carried out at a temperature of 180°-250° C.

3. The process of claim 1, said catalyst essentially comprising alumina.

4. The process of claim 3 wherein the regeneration temperature of said catalyst is in the range of 500°-650° C.

5. The process of claim 1, said catalyst essentially comprising titania.

6. The process of claim 5 wherein the regeneration temperature of said catalyst is in the range of 400°-600° C.